(12) United States Patent
Goldman et al.

(10) Patent No.: US 8,116,720 B2
(45) Date of Patent: Feb. 14, 2012

(54) METHOD AND APPARATUS FOR EMERGENCY CALL ROUTING USING AN END NODE

(75) Inventors: Stuart O. Goldman, Scottsdale, AZ (US); Douglas H. Rollender, Bridgewater, NJ (US)

(73) Assignee: Alcatel Lucent, Paris (FR)

( * ) Notice: Subject to any disclaimer, the term of this patent is extended or adjusted under 35 U.S.C. 154(b) by 461 days.

(21) Appl. No.: 11/124,399

(22) Filed: May 6, 2005

(65) Prior Publication Data

US 2006/0252407 A1    Nov. 9, 2006

(51) Int. Cl.
*H04M 11/04* (2006.01)
(52) U.S. Cl. .................. 455/404.1; 455/404.2; 455/521; 379/45
(58) Field of Classification Search .... 455/404.1–404.2, 455/417, 521; 370/352; 379/45
See application file for complete search history.

(56) References Cited

U.S. PATENT DOCUMENTS

| 6,061,561 | A | 5/2000 | Alanara et al. | 455/422 |
| 6,256,489 | B1 | 7/2001 | Lichter et al. | 455/404 |
| 7,130,385 | B1 * | 10/2006 | Moon | 379/45 |
| 2003/0086539 | A1 | 5/2003 | McCalmont et al. | 379/45 |
| 2004/0190497 | A1 * | 9/2004 | Knox | 370/352 |
| 2006/0056388 | A1 * | 3/2006 | Livingood | 370/352 |
| 2006/0221854 | A1 * | 10/2006 | Price et al. | 370/253 |
| 2006/0233317 | A1 * | 10/2006 | Coster et al. | 379/45 |

OTHER PUBLICATIONS

"Traceroute." Wikipedia. Apr. 20, 2005.*
PCT Search Report from PCT/US2006/016455 dated Oct. 24, 2006.

* cited by examiner

*Primary Examiner* — Wayne Cai
(74) *Attorney, Agent, or Firm* — Williams, Morgan & Amerson, PC

(57) ABSTRACT

A method is provided for routing an emergency call. The method comprises receiving an emergency call and identifying an end node associated with the call. The end node may be a communications device involved in establishing the emergency call that is geographically near the originator of the emergency call. A look-up table is then accessed to identify the appropriate public safety answering point (PSAP) associated with the end node, and the emergency call is routed to the identified PSAP.

7 Claims, 5 Drawing Sheets

METHOD AND APPARATUS FOR EMERGENCY CALL ROUTING USING AN END NODE

BACKGROUND OF THE INVENTION

1. Field of the Invention

This invention relates generally to telecommunications, and, more particularly, to wireless communications.

2. Description of the Related Art

In the field of wireless telecommunications, such as cellular telephony, a system typically includes a plurality of base stations distributed within an area to be serviced by the system. Various users within the area, fixed or mobile, may then access the system and, thus, other interconnected telecommunications systems, via a wireless link with one or more of the base stations. Typically, a mobile device maintains communications with the system as the mobile device passes through an area by communicating with one and then another base station, as the user moves. The mobile device may communicate with the closest base station, the base station with the strongest signal, the base station with a capacity sufficient to accept communications, etc.

Generally, voice and data may be transmitted over the wireless link using two basic switching technologies. Traditional voice telephone calls, as well as data provided by a modem, are transmitted using a circuit-switched connection. Alternatively, voice and data may be transmitted over a packet-switched network using a Voice over Internet Protocol (often referred to as VoIP). Both the circuit-switched and the packet-switched networks may include wired and/or wireless connections. The Voice over Internet Protocol is increasingly common, at least in part because VoIP can handle voice and data communications homogeneously. Moreover, transmitting voice with VoIP may help reduce operational costs. In addition to conventional land-line telephones and cellular telephones, VoIP may be used to incorporate voice communications in devices such as personal data assistants, laptop computers, desktop computers, and the like.

The mobility of these devices introduces an element of variability regarding their location at any given time. Those skilled in the art will appreciate that the location of an emergency E911 call originating from such a mobile device may be highly useful to insure that assistance arrives in a timely fashion. For example, emergency calls are currently directed to an "appropriate" Public Safety Answering Point (PSAP) associated with the location from which an emergency call originates. A PSAP is a facility that is equipped and staffed on a 24-hour basis to receive and process emergency E911 calls. Generally, the phone number for each device on a fixed or land line network capable of initiating an E911 call has an appropriate PSAP associated with it to receive that E911 call. This is because land line telephone numbers are assigned geographically. However, owing to the mobility of devices, such as cell phones, personal data assistants (PDAs), laptop computers, and the like, the appropriate PSAP may vary, depending upon the current location of the mobile device, not the geographic location to which the number would belong if assigned to a non-mobile device.

SUMMARY OF THE INVENTION

The present invention is directed to overcoming, or at least reducing, the effects of one or more of the problems set forth above.

In one aspect of the instant invention, a method is provided for routing an emergency call. The method comprises receiving an emergency call, identifying an end node associated with the call; and routing the emergency call to a public safety answering point associated with the end node.

In another aspect of the instant invention, a method is provided for routing an emergency call. The method comprises receiving an emergency call at an end node, and appending a unique identifier associated with the end node to the emergency call to allow the emergency call to be routed to a public safety answering point associated with the first end node.

BRIEF DESCRIPTION OF THE DRAWINGS

The invention may be understood by reference to the following description taken in conjunction with the accompanying drawings, in which like reference numerals identify like elements, and in which.

Figure 1A:
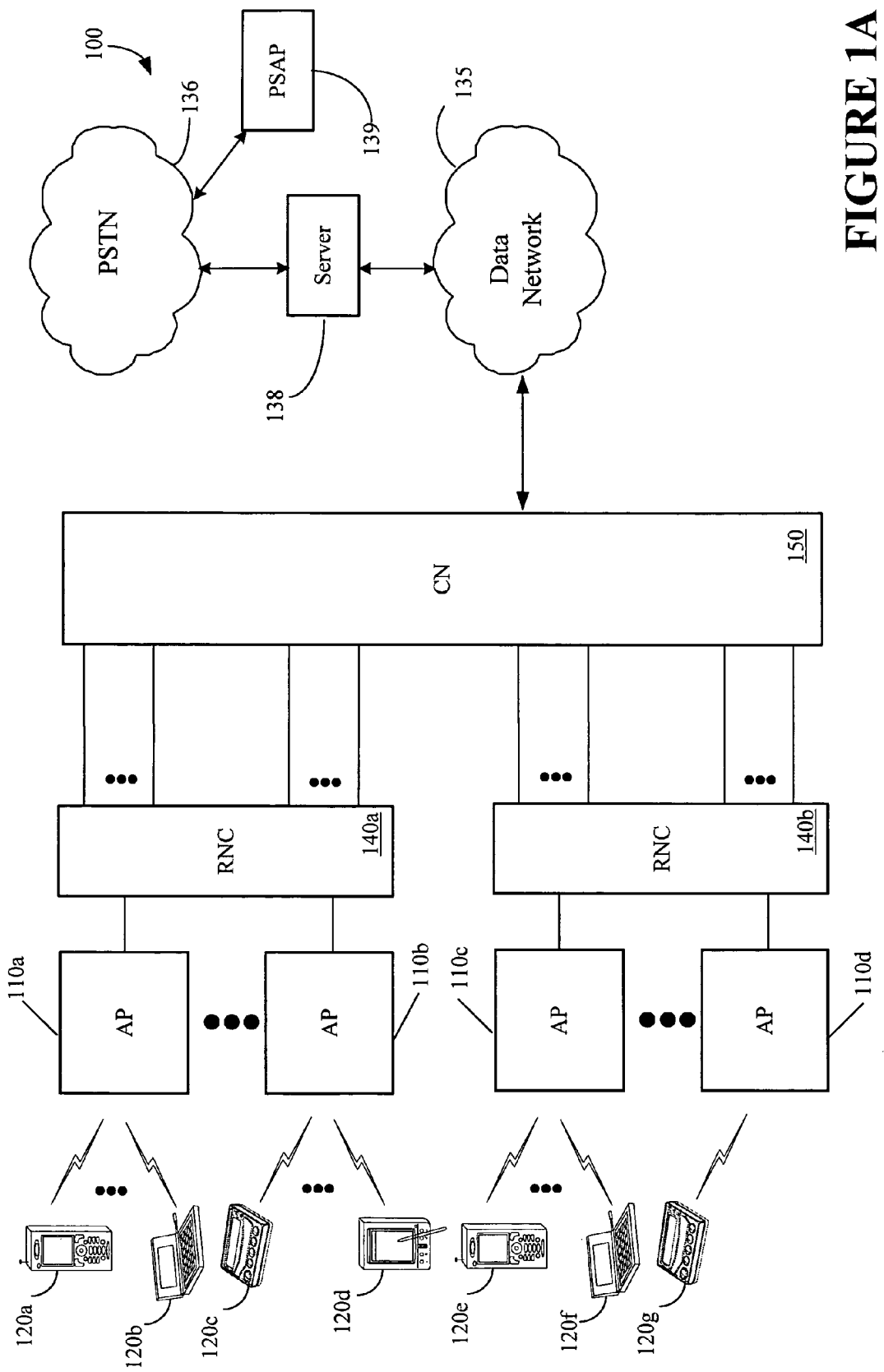
FIGS. 1A-1B are block diagrams of exemplary communications system in which the instant invention may be deployed.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

The instant invention is directed to an innovative method for locating an emergency caller, and using the location information to route the emergency call to an appropriate Public Safety Answering Point (PSAP). Additionally, the location information is also used to provide a callback capability from the PSAP to the E911 call originator. Generally, the appropriate PSAP is determined based upon a mapping of a component that has a known geographic location near the emergency caller. For example, if the emergency caller connects through a fixed access point (AP), the identity of the AP is transmitted along with the data packets of the call. A map or look-up table is then used to route the emergency call to the PSAP address associated with the AP identity. Since the AP is at a fixed geographic location, the appropriate PSAP should be contacted.

Turning now to the drawings, and specifically referring to FIG. 1A, a communications system 100 is illustrated, in accordance with one embodiment of the present invention. For illustrative purposes, the communications system 100 of FIG. 1 is a Wi-Fi system, although it should be understood that the present invention may be applicable to other systems that support data and/or voice communication over a wireless link. The communications system 100 allows one or more mobile devices 120 to communicate with a data network 135, such as the Internet, and/or a public telephone system (PSTN) 136 through one or more APs 110. The mobile device 120 may take the form of any of a variety of devices, including wireless phones, personal digital assistants (PDAs), laptop computers, digital pagers, wireless cards, and any other device capable of accessing the data network 135 and/or the PSTN 136 through the AP 110. In one embodiment of the instant invention, the AP 110 may take the form of a wireless access point (WAP) that supports communications under the Institute of Electrical and Electronics Engineers (IEEE) standard 802.11. Alternatively, the instant invention may find application in the Worldwide Interoperability for Microwave Access (WiMax), which is governed by IEEE standard 802.16. In WiMax, the AP 110 may take the form of a WiMax tower (not shown). Those skilled in the art will appreciate that Wi-Fi systems typically employ relatively short-range wireless communications and may be found in consumer homes, airports, hotels, coffee shops, businesses and the like. WiMax systems, on the other hand, involve longer-range wireless links and may be deployed to service larger areas such as towns or neighborhoods.

In one embodiment of the instant invention, a plurality of the APs 110 may be coupled to a Radio Controller (RC) 140 by one or more connections, such as an Ethernet line, fiber optic cable, and the like. Although two RCs 140 are illustrated, those skilled in the art will appreciate that more, or fewer, RCs 140 may be utilized depending on the number of APs 110. Generally, the RC 140 operates in coordination with the APs 110 to which it is connected with the aid of software (not shown) in the RC 140 and software (not shown) in the AP 110. The RC 140 generally may be involved in coordinating the transition of the mobile device 120 during transitions (e.g., handoffs) between the APs 110.

The RCs 140 may also be coupled to a Core Network (CN) 150 via a connection, which may take on any of a variety of forms. Generally the CN 150 operates as an interface to the data network 135. The CN 150 may perform a variety of functions and operations, such as user authentication, however, a detailed description of the structure and operation of the CN 150 is not necessary to an understanding and appreciation of the instant invention. Accordingly, to avoid unnecessarily obfuscating the instant invention, further details of the CN 150 are not presented herein.

Data packets from the mobile device 120 are ultimately delivered to the data network 135, which may forward the packets to a publicly switched telephone network (PSTN) 136 via a server 138, such as in the case of a Voice over Internet Protocol (VoIP) application.

Figure 1B:
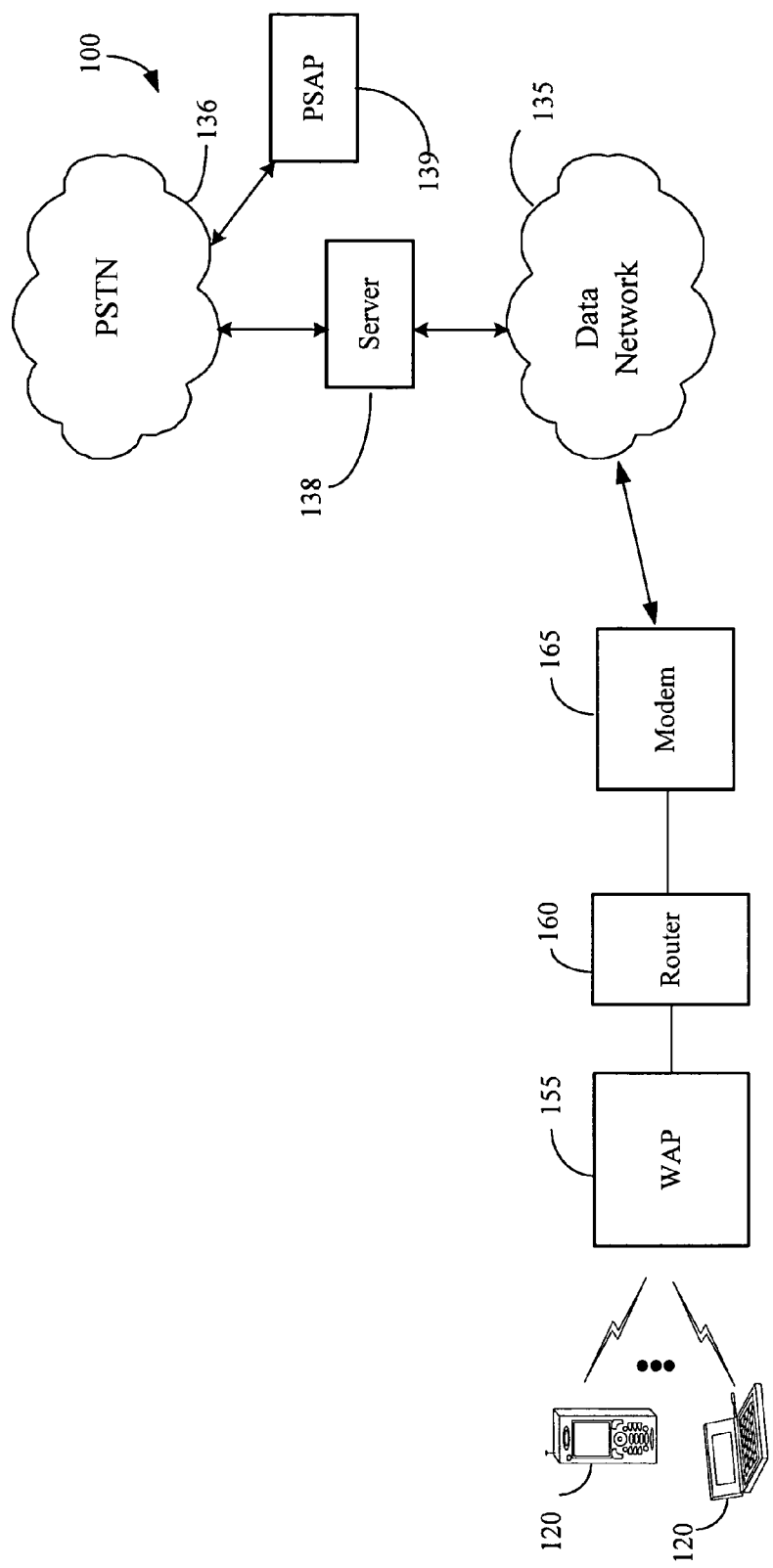

Alternatively, as shown in FIG. 1B, the mobile device 120 may operatively connect with the data network 135 through a wireless access point (WAP) 125. In some applications, a router 160 and modem 165 may be disposed intermediate the WAP 155 and the data network 135. The mobile device 120 may take the form of an IP or packet-switch based device, e.g., an IP-based hardphone or a softphone running on a computer or other like platform. The modem 165 may take the form of a cable modem, a digital subscriber line modem, or the like. Those skilled in the art will appreciate that additional equipment associated with an internet service provider (ISP), such as a cable operator or telephone company, may be deployed between the modem 165 and the data network 135, and that this equipment may operate as an end node similar to the operation of the WAP 155, Router 160 and modem 165 discussed more fully below.

The mobile device 120 may be provisioned with an emergency calling feature or function (ECF). The ECF is optionally invoked in by dialing a selected number, e.g., 9-1-1. Suitably, however, the mobile device 120 may also be provisioned with an activation button or key that the subscriber employs to selectively invoke the ECF. The activation button or key is optionally a hard button or alternately a soft button programmed to invoke the ECF. Alternately, the ECF may be selected by the subscriber from a pull-down menu or other like directory or list presented on the mobile device's display. Invoking the emergency calling feature or function generates a call or message from the mobile device 120 that is ultimately directed over the PSTN 136, such as via the server 138, in the usual manner to the PSAP 139.

Generally, when the ECF is invoked by the mobile device 120, it is received by a commercial ISP, which may route the "call" to the appropriate PSAP. This routing may be accomplished in at least two ways. Either the commercial ISP can handle the routing directly or a Public Safety Agency acting as ISP (PSISP) can take control and route the call. For the first alternative, the commercial ISP can "hand over" session control to the PSISP in much the same manner as commonly occurs, such as when a user goes from a Google search to a particular web page. The difference here, however, is that commercial ISP will not respond to a query with a list of options as Google responds today to a search request. Instead, the call will go directly to the PSAP call taker who responds with voice or perhaps video or whatever the caller's terminal can support. With the second alternative, the access service provider may recognize the emergency call and go to the PSISP without involving the ISP usually present in a non-emergency situation.

Thus, those skilled in the art will appreciate that the communications system 100 enables the mobile devices 120 to communicate with the data network 135 and/or the PSTN 136. It should be understood, however, that the configuration of the communications system 100 of FIGS. 1A and 1B is exemplary in nature, and that fewer or additional components may be employed in other embodiments of the communications system 100 without departing from the spirit and scope of the instant invention.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Figure 2:
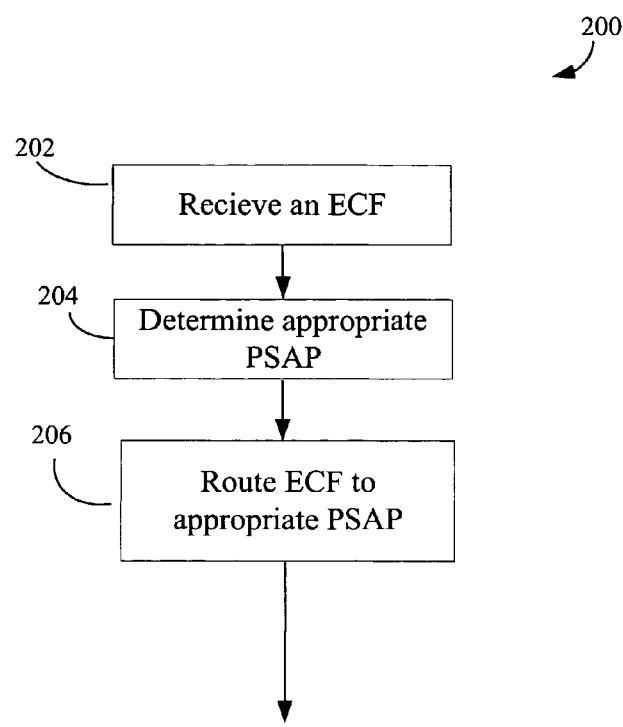
FIG. 2 is a stylistic flowchart representation of a control scheme for routing emergency E911 calls.

Turning now to FIG. 2, a flowchart of one embodiment of a control scheme 200 that may be implemented to control the routing of emergency 911 calls is shown. Generally, the functionality of the control scheme 200 may be implemented in hardware, software or a combination thereof at various locations in the communications system 100, such as within the server 138. Generally, the control scheme 200 uses the end node identity to find the PSAP number (or address) associated with either the mobile location or fixed termination point for the fixed line (e.g., HID line termination location).

The process begins at block 202, with the server 138 receiving an indication that one of the mobile devices 120 has invoked an ECF. The end node communicating with the mobile device 120 has appended a unique identifier to the ECF. For example, if the ECF is generated by the mobile device 120e of FIG. 1A, then the AP 110c is the end node communicating with the mobile device 120e. Thus, the AP 110c appends its unique identifier to the ECF and forwards it to the server 138. Alternatively, if the ECF is generated by the mobile device 120g, then the AP 110d is the end node communicating with the mobile device 120g, and the AP 110d appends its unique identifier to the ECF and forwards it to the server 138.

Figure 3:
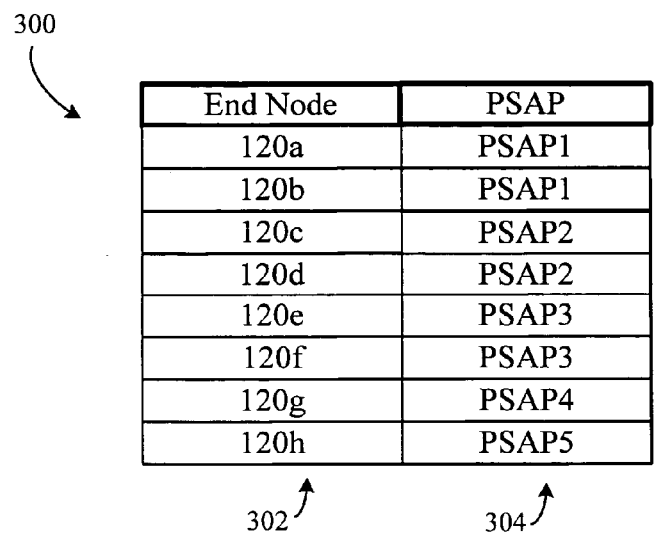
FIG. 3 is a stylistic representation of a look-up table that may be employed by the control scheme of FIG. 2.

At block 204, the control scheme 200 determines an appropriate PSAP, such as by accessing a look-up table 300, such as is stylistically illustrated in FIG. 3, using the unique end node identifier. As can be seen in FIG. 3, the look-up table 300 includes two sets of entries. The first set of entries 302 corresponds to the unique end node identifiers. The second set of entries 304 corresponds to the appropriate PSAP associated with each of the end nodes. Thus, based on the identity of the end node, the look-up table 300 identifies the appropriate PSAP to which the emergency 911 call should be routed.

Thereafter, at block 206, the control scheme 200 routes the emergency 911 call to the appropriate PSAP, as determined from the look-up table 300. Those skilled in the art will appreciate that the end node may be any equipment involved in communicating with the mobile device 120 that is geographically near the mobile device 120. For example, in the communication system 100 of FIG. 1A it may be useful in some instances to use the RC 140 as the end node. Alternatively, referring to FIG. 1B, additional communications equipment, such as the router 160 or modem 165 may be used as the end node, and its unique identifier used to access the look-up table 300. Using the modem 165, as opposed to the WAP 155, as the end node may be useful in situations where the unique identifier associated with the WAP 125 is not found in the look-up table 300. Such a situation may occur when the WAP 125 is first used, such that the look-up table 300 has not yet been updated with the new information, but the unique identifier associated with the modem 165 is in the look-up table 300. Those skilled in the art will appreciate that the control scheme 200 may be provisioned to use the next nearest device, relative to the mobile device 120, each time an end node is not found in the look-up table 300.

Figure 4:
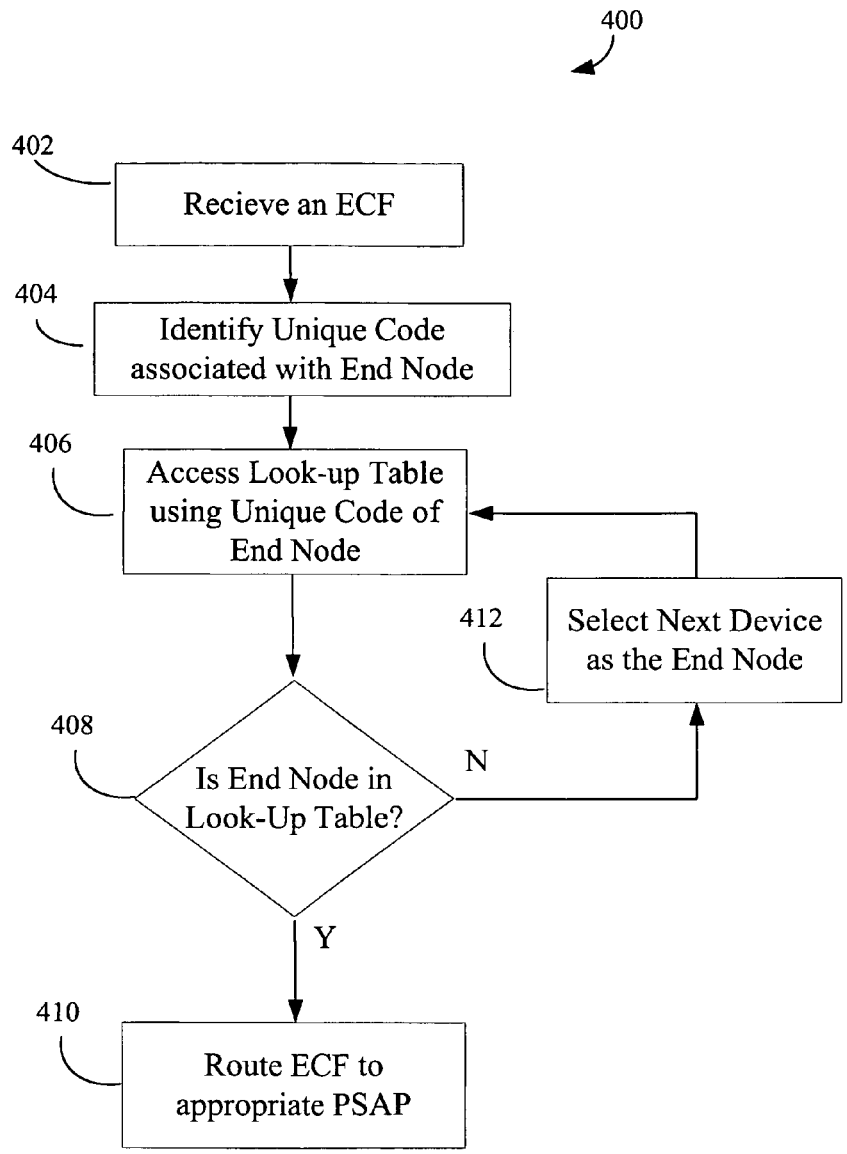
FIG. 4 is a stylistic flowchart of a control scheme for routing an emergency calling feature/function.

For example, turning now to the flowchart illustrated in FIG. 4, an alternative process 400 begins at block 402, with the server 138 receiving an indication that one of the mobile devices 120 has invoked an ECF. Each node, such as the WAP 155, the router 160, and the modem 165, has appended a unique identifier to the ECF.

At block 404, the unique ID of the node closest to the mobile device 120 that initiated the ECF is selected to be the end node. The control scheme 400 then determines an appropriate PSAP by accessing the look-up table 300 using the unique end node identifier at block 406.

Thereafter, at decision block 408, the control scheme 400 determines if the look-up has been successful. That is the control scheme 400 determines whether the unique code is contained in the look-up table 300. If so, the control scheme 400 routes the emergency 911 call to the appropriate PSAP, as determined from the look-up table 300. Alternatively, if the control scheme 400 determines that the unique code is not located in the look-up table, then control transfers to block 412 where the next closest device is selected as the end node. In the exemplary communications system illustrated in FIG. 1B, the router 160 is selected as the end node. Thereafter, control transfers to block 406 where the look-up process is repeated to determine if the next closest device has been registered with the look-up table. If so, the emergency 911 call is routed to the appropriate PSAP associated with the currently selected end node. If not, the process repeats again with the next closest device, such as the modem 165 until a registered device is found in the look-up table.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the control units cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. A method for routing an emergency call wherein the call sequentially traverses two or more nodes in a transmission path of the call, the method comprising:
providing a data base in which respective, unique node identifiers for the two or more nodes in the transmission path may be mapped to a public safety answering point (PSAP) established to serve calls arriving at the mapped node, wherein ones of the two or more nodes operate to embed in the call the respective, unique identifiers for the traversed nodes;
receiving an emergency call;
sequentially evaluating the node identifiers, beginning with the identifier for the node most proximate to an originator of the emergency call until a node identifier is found having a mapping in the data base to a PSAP;

selecting the node having a mapping to a PSAP as an end node for the call; and routing the emergency call to the public safety answering point associated with the selected end node.

2. A method, as set forth in claim 1, wherein selecting one of the first and second nodes as the end node as a function of the proximity of the first and second nodes to the originator of the emergency call further comprises selecting the node closest to the originator of the emergency call as the end node.

3. A method, as set forth in claim 1, wherein selecting the node closest to the originator of the emergency call as the end node further comprises selecting the node closest to the originator of the emergency call that has a public safety answering point associated therewith as the end node.

4. A method, as set forth in claim 1, wherein routing the emergency call to the public safety answering point associated with the end node further comprises accessing a look-up table using a unique identifier associated with the end node to determine the appropriate public safety answering point.

5. A method, as set forth in claim 4, further comprising maintaining the look-up table with information correlating unique identifiers associated with end nodes and appropriate public safety answering points.

6. A method, as set forth in claim 1, wherein routing the emergency call to the public safety answering point associated with the end node further comprises accessing a map using a unique identifier associated with the end node to determine the appropriate public safety answering point.

7. A method, as set forth in claim 6, further comprising maintaining the map with information correlating unique identifiers associated with end nodes and appropriate public safety answering points.

* * * * *